US011498517B2

(12) United States Patent
Ito et al.

(10) Patent No.: US 11,498,517 B2
(45) Date of Patent: Nov. 15, 2022

(54) RESTRAINING DEVICE CONTROL SYSTEM

(71) Applicant: Toyota Jidosha Kabushiki Kaisha, Toyota (JP)

(72) Inventors: Masaki Ito, Toyota (JP); Hiroshi Hiraiwa, Toyota (JP); Michio Ikeda, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 554 days.

(21) Appl. No.: 16/582,677

(22) Filed: Sep. 25, 2019

(65) Prior Publication Data

US 2020/0101936 A1 Apr. 2, 2020

(30) Foreign Application Priority Data

Sep. 28, 2018 (JP) .............................. JP2018-185272

(51) Int. Cl.
*B60R 21/00* (2006.01)
*B60R 22/48* (2006.01)
*B60N 2/42* (2006.01)
*B60R 22/46* (2006.01)

(52) U.S. Cl.
CPC ............... *B60R 22/48* (2013.01); *B60N 2/42* (2013.01); *B60R 2022/4808* (2013.01); *B60R 2022/4866* (2013.01)

(58) Field of Classification Search
CPC ... B60R 21/015; B60R 21/0134; B60R 21/02; B60R 21/16; B60R 22/46; B60N 22/48; B60N 2/42
See application file for complete search history.

(56) References Cited

U.S. PATENT DOCUMENTS

| 5,707,109 A * | 1/1998 | Massara ................. B60N 2/914 297/452.34 |
| 6,056,079 A * | 5/2000 | Cech ...................... B60N 2/002 177/144 |
| 7,992,669 B2 * | 8/2011 | Odate ..................... B60R 22/46 701/45 |
| 10,232,814 B2 * | 3/2019 | Gandhi ............... B60R 21/0134 |

(Continued)

FOREIGN PATENT DOCUMENTS

| JP | 2001-010447 A | 1/2001 |
| JP | 2003-212071 A | 7/2003 |

(Continued)

*Primary Examiner* — Tan Q Nguyen
(74) *Attorney, Agent, or Firm* — Dinsmore & Shohl LLP (57) ABSTRACT

A restraining device control system includes: a restraining device that is provided at a vehicle seat and that restrains an occupant seated in the vehicle seat; a surrounding environment detection unit that detects an environment surrounding a vehicle; and a control unit that increases a restraining force on the occupant by the restraining device in a case in which it has been predicted, from the surrounding environment of the vehicle, that vacillation of the vehicle while in an autonomous driving mode will exceed a threshold amount and that decreases the restraining force on the occupant by the restraining device in a case in which it has been predicted, from the surrounding environment of the vehicle, that the vehicle will maintain a state in which vacillation of the vehicle while in the autonomous driving mode is less than the threshold amount.

4 Claims, 8 Drawing Sheets

(56) References Cited

U.S. PATENT DOCUMENTS

| | | | |
|---|---|---|---|
| 10,464,456 B2* | 11/2019 | Boccuccia | ............... B60N 2/62 |
| 2010/0030435 A1 | 2/2010 | Hattori et al. | |
| 2010/0191426 A1 | 7/2010 | Miyajima et al. | |
| 2017/0334452 A1 | 11/2017 | Abe et al. | |
| 2018/0056829 A1* | 3/2018 | Duncan | .................. B60N 2/682 |

FOREIGN PATENT DOCUMENTS

| JP | 2006-315683 A | 11/2006 |
|---|---|---|
| JP | 2008-126728 A | 6/2008 |
| JP | 2010-163041 A | 7/2010 |
| JP | 2017-206153 A | 11/2017 |
| JP | 2017-206200 A | 11/2017 |
| JP | 2018-138411 A | 9/2018 |

\* cited by examiner

RESTRAINING DEVICE CONTROL SYSTEM

CROSS-REFERENCE TO RELATED APPLICATION

This application claims priority under 35 USC § 119 from Japanese Patent Application No. 2018-185272, filed on Sep. 28, 2018, the disclosure of which is incorporated by reference herein.

BACKGROUND

Technical Field

The present disclosure relates to a restraining device control system.

Related Art

Japanese Patent Application Laid-open (JP-A) No. 2017-206200 discloses a self-driving car that identifies whether another vehicle approaching the host vehicle is in an autonomous driving mode or a manual driving mode and, depending on the identification result, controls occupant protection devices.

The self-driving car disclosed in JP-A No. 2017-206200 ensures occupant protection performance by allowing the occupant to be protected by the occupant protection devices in a case where a vehicle in the manual driving mode is approaching the host vehicle. However, there is room for improvement with respect to achieving a balance between occupant comfort and safety in the autonomous driving mode.

SUMMARY

The present disclosure provides a restraining device control system that may achieve a balance between occupant comfort and safety in the autonomous driving mode.

A first aspect of the present disclosure is a restraining device control system including: a restraining device that is provided at a vehicle seat and that restrains an occupant seated in the vehicle seat; a surrounding environment detection unit that detects an environment surrounding a vehicle; and a control unit that increases a restraining force on the occupant by the restraining device in a case in which it has been predicted, from the surrounding environment of the vehicle detected by the surrounding environment detection unit, that vacillation of the vehicle while in an autonomous driving mode will exceed a threshold amount and that decreases the restraining force on the occupant by the restraining device in a case in which it has been predicted, from the surrounding environment of the vehicle detected by the surrounding environment detection unit, that the vehicle will maintain a state in which vacillation of the vehicle while in the autonomous driving mode is less than the threshold amount.

The restraining device control system of the first aspect has the restraining device provided at the vehicle seat and that is configured to restrain, with the restraining device, the occupant seated in the vehicle seat. Furthermore, the environment surrounding the vehicle is detected by the surrounding environment detection unit. Moreover, the restraining device control system has the control unit. Here, the control unit increases the restraining force on the occupant resulting from the restraining device in a case in which it has been predicted, from the surrounding environment of the vehicle detected by the surrounding environment detection unit, that vacillation of the vehicle while in the autonomous driving mode will exceed a threshold amount. Because of this, the occupant may be well restrained even in a case in which the behavior of the vehicle will become large.

Furthermore, the control unit decreases the restraining force on the occupant resulting from the restraining device in a case in which it has been predicted, from the surrounding environment of the vehicle detected by the surrounding environment detection unit, that the vehicle will maintain a state in which vacillation of the vehicle while in the autonomous driving mode is less than the threshold amount. Because of this, occupant comfort may be enhanced.

In a second aspect of the present disclosure, in the first aspect, the restraining device may include a seat belt device that restrains the occupant in the vehicle seat, and the control unit may increase the restraining force on the occupant by the seat belt device in a case in which it has been determined by the surrounding environment detection unit that a road surface on which the vehicle is going to travel contains a threshold number of bumps, dips or any combination thereof.

The restraining device control system of the second aspect may inhibit the seating position of the occupant from changing by increasing the restraining force on the occupant resulting from the seat belt device even in a case in which there are many bumps and dips in the road surface.

In a third aspect of the present disclosure, in the first aspect or the second aspect, the restraining device may include side support devices that are provided on both seat width direction sides of a seat back of the vehicle seat and which, upon activation, project in a seat forward direction to inhibit inertial movement of the occupant in a seat width direction, and the control unit may activate the side support devices in a case in which it has been determined by the surrounding environment detection unit that a route that the vehicle is going to travel contains a threshold number of curves.

The restraining device control system of the third aspect may inhibit inertial movement of the occupant in the seat width direction by activating the side support devices to cause both seat width direction sides of the seat back to project in the seat forward direction even in a case in which there are many curves in the route the vehicle is going to travel.

In a fourth aspect of the present disclosure, in any one of the first aspect to the third aspect, the control unit may decrease the restraining force on the occupant by the restraining device in a case in which it has been determined by the surrounding environment detection unit that the vehicle is traveling on a cars-only road.

In the restraining device control system of the fourth aspect, the behavior of the vehicle is less likely to become large while the vehicle is traveling in the autonomous driving mode on a cars-only road that has few bumps and dips in the road surface and few sharp curves. In such cases, comfort performance may be enhanced by decreasing the restraining force on the occupant by the restraining device.

As described above, according to the restraining device control system of the present disclosure a balance may be achieved between occupant comfort and safety in the autonomous driving mode.

BRIEF DESCRIPTION OF THE DRAWINGS

An exemplary embodiment of the present disclosure will be described in detail based on the following figures, wherein.

DETAILED DESCRIPTION

A restraining device control system 10 pertaining to an exemplary embodiment will be described with reference to the drawings. It will be noted that dimensional ratios in the drawings are exaggerated for convenience of description and may differ from actual dimensional ratios. Furthermore, arrow FR, arrow UP, and arrow RH appropriately illustrated in the drawings respectively indicate a seat forward direction, a seat upward direction, and a rightward direction when facing the seat forward direction of a vehicle seat. Below, when description is given simply using the directions of front/rear, upper/lower, and right/left, unless otherwise specified these will be understood to mean front/rear in the seat front and rear direction, upper/lower in the seat up and down direction, and right/left in the seat width direction of the vehicle seat.

Figure 1:
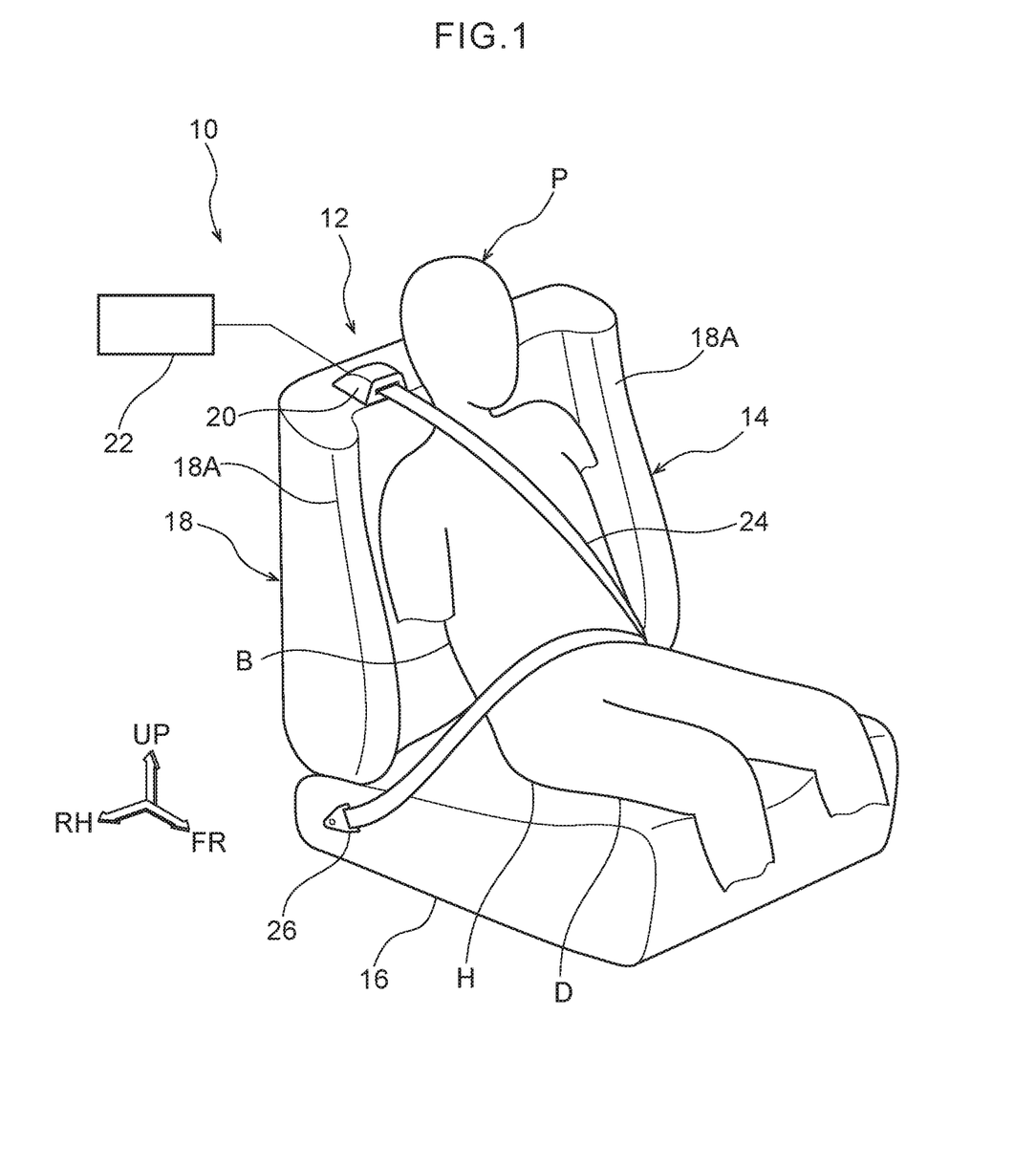
FIG. 1 is a perspective view illustrating the general configuration of a restraining device control system pertaining to the exemplary embodiment.

As illustrated in FIG. 1, the restraining device control system 10 pertaining to the present exemplary embodiment has a seat belt device 12 serving as a restraining device. The seat belt device 12 is installed in a vehicle seat 14.

The vehicle seat 14 is, as an example, disposed in the position of a driver's seat of a vehicle not illustrated in the drawings. Here, the vehicle is a self-driving car that can travel autonomously without the input of an occupant P and is configured to be switchable between a manual driving mode in which the occupant P drives the vehicle and an autonomous driving mode in which the vehicle travels autonomously.

The vehicle seat 14 has a seat cushion 16 that can support buttocks H and thighs D of the occupant P from the seat lower side. A seat back 18 is connected to the rear end portion of the seat cushion 16. The seat back 18 can support a back B of the occupant P.

Here, a retractor 20 that configures the seat belt device 12 is provided on the upper end portion of the seat back 18. The retractor 20 is provided on the seat right side of the upper end portion of the seat back 18 and is electrically connected to an electronic control unit (ECU) 22 serving as a control unit described later.

The retractor 20 is provided with a spool not illustrated in the drawings, and one end of long band-like webbing 24 is wound around the spool. The webbing 24 is pulled out from the retractor 20 to extend diagonally across the upper body of the occupant P, is passed through a tongue engaged with a buckle (not illustrated in the drawings) provided on the seat left side, and is folded back.

The webbing 24 folded back at the tongue extends to the seat right side and is secured to an anchor portion 26 provided on the right-side end portion of the seat cushion 16. In this way, the seat belt device 12 of the present exemplary embodiment has a seat-mounted configuration in which it is attached to the vehicle seat 14. For this reason, when the vehicle is in the autonomous driving mode, the vehicle seat 14 can be freely rotated to change the direction the vehicle seat 14 faces. In the state illustrated in FIG. 1, the buckle and the tongue are engaged with each other and the occupant P is restrained in the vehicle seat 14 by the webbing 24.

Figure 3A:
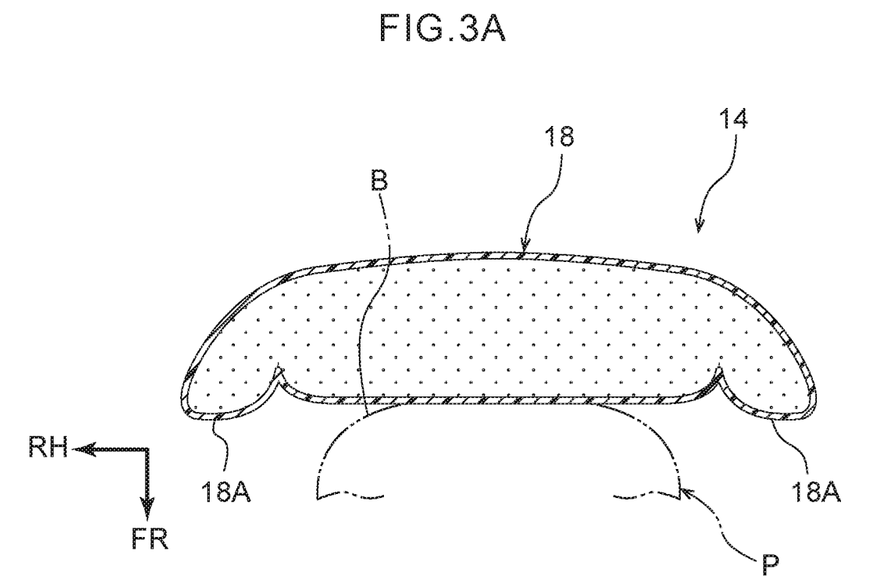
FIG. 3A is a plan sectional view for describing restraint of the occupant by side support devices in a state in which restraining force has been decreased.
Figure 3B:
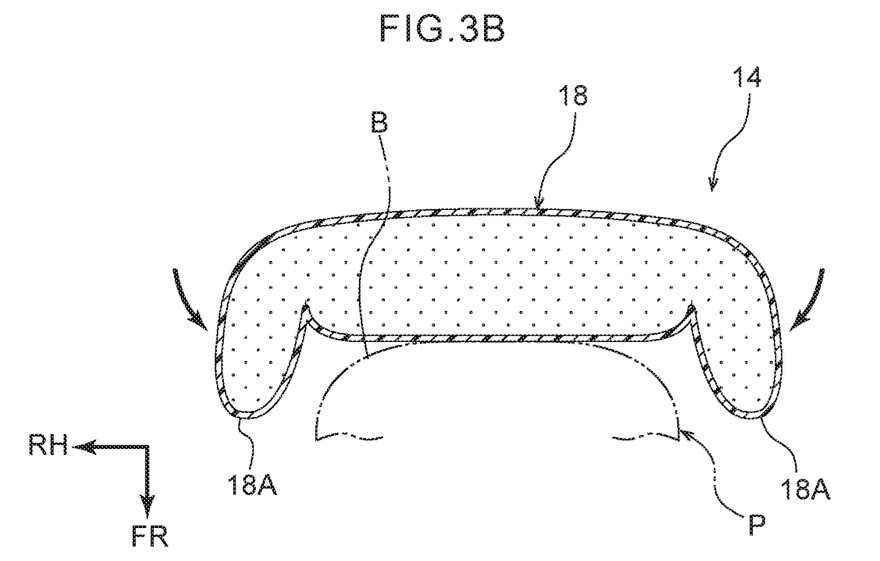
FIG. 3B is a plan sectional view for describing restraint of the occupant by the side support devices in a state in which restraining force has been increased.

Side support portions 18A are provided on both seat width direction sides of the seat back 18. Here, the side support portions 18A are configured to be movable between a non-restraining state in which they are spread open in the seat width direction as illustrated in FIG. 3A and a restraining state in which they project in the seat forward direction as illustrated in FIG. 3B. In the restraining state illustrated in FIG. 3B, the side support portions 18A are positioned on both sides of the occupant P seated in the vehicle seat 14 and may restrain inertial movement of the occupant P in the seat width direction.

Figure 4:
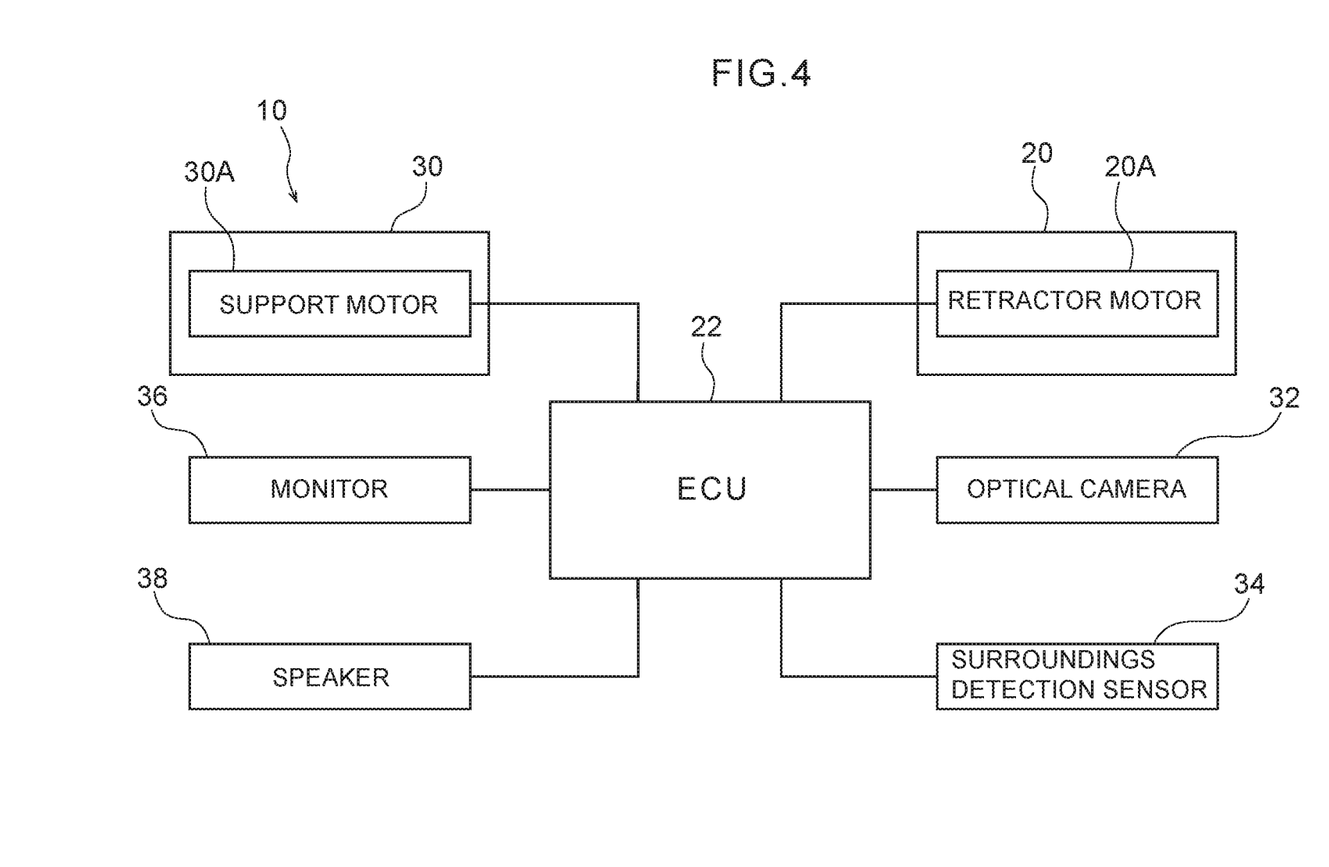
FIG. 4 is a block diagram illustrating the hardware configuration of the restraining device control system pertaining to the exemplary embodiment.

FIG. 4 is a block diagram illustrating the hardware configuration of the restraining device control system 10. As illustrated in FIG. 4, the ECU 22 that configures the restraining device control system 10 is electrically connected to a retractor motor 20A, a support motor 30A, an optical camera 32, a surroundings detection sensor 34, a monitor 36, and a speaker 38.

The retractor motor 20A is provided inside the retractor 20 illustrated in FIG. 1. Upon activation, the retractor motor 20A rotates the spool to pull the webbing 24 into the retractor 20 or let the webbing 24 out from the retractor 20.

Figure 2A:
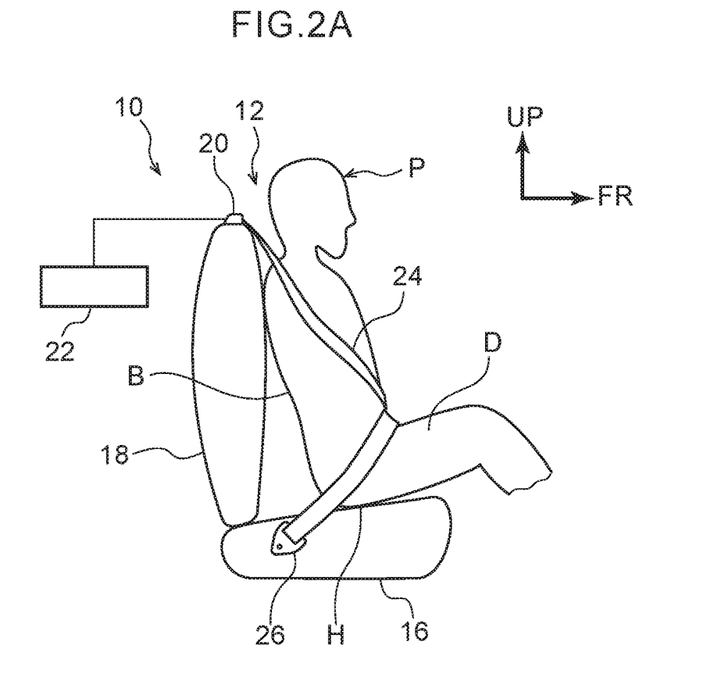
FIG. 2A is a side view for describing restraint of an occupant by a seat belt device in a state in which restraining force has been decreased.

Here, in the state illustrated in FIG. 2A, there is little tension acting on the webbing 24 and the restraining force on the occupant P is decreased. When the retractor 20 is activated from this state, the spool is rotated by the retractor motor 20A to pull the webbing 24 into the retractor 20. In this way, the tension in the webbing 24 increases and the restraining force on the occupant P is increased as illustrated in FIG. 2B.

Figure 2B:
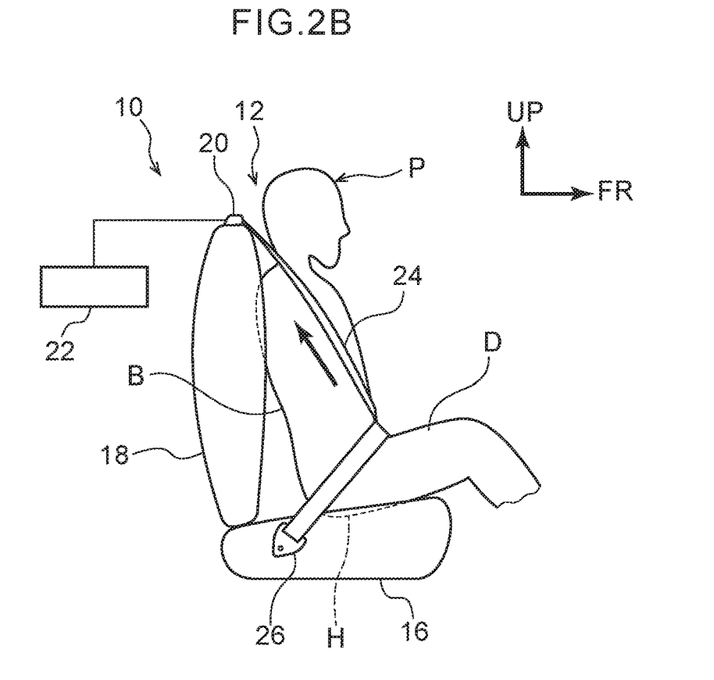
FIG. 2B is a side view for describing restraint of the occupant by the seat belt device in a state in which restraining force has been increased.

Conversely, when the spool is reversely rotated by the retractor motor 20A from the state in FIG. 2B, the webbing 24 may be let out from the retractor 20 to decrease the tension in the webbing 24 as illustrated in FIG. 2A.

As illustrated in FIG. 4, the support motor 30A electrically connected to the ECU 22 is a motor provided in side support devices 30 serving as restraining devices. The side support devices 30 are provided inside the seat back 18, and when the support motor 30A is activated, the side support portions 18A may be moved between the non-restraining state in FIG. 3A and the restraining state in FIG. 3B.

The optical camera 32 illustrated in FIG. 4 is a camera that images the vehicle surroundings and includes, for example, a CCD image sensor, a CMOS image sensor, and a MOS image sensor. The surroundings detection sensor 34 is a sensor that detects the surroundings of the vehicle and is configured to include, for example, a laser radar, an ultrasonic sensor, and a millimeter wave sensor. The surroundings detection sensor 34 may also be configured by a combination of multiple sensors.

The monitor 36 is a monitor that displays information from the ECU 22 and includes, for example, a center display disposed in an instrument panel in the front portion of the cabin and a head-up display disposed in front of the driver's seat. The speaker 33 is a speaker for outputting, by audio, information from the ECU 22.

Figure 5:
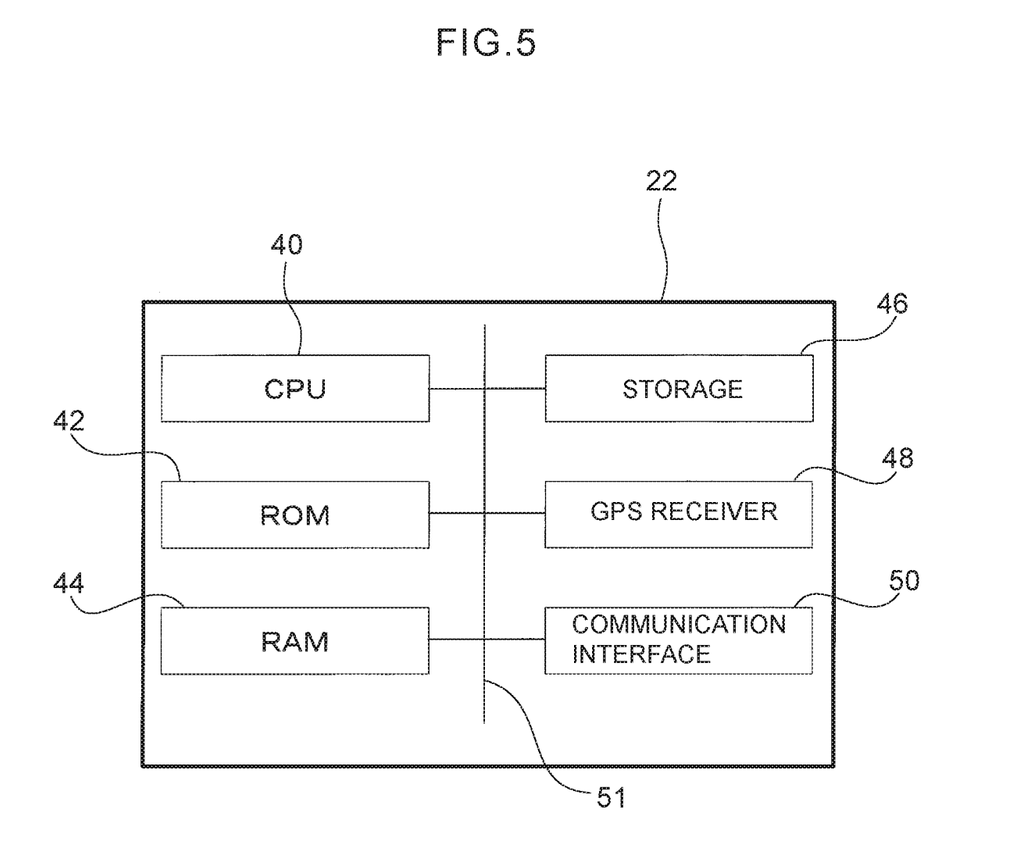
FIG. 5 is a block diagram illustrating the hardware configuration of art ECU pertaining to the exemplary embodiment.

FIG. 5 is a block diagram illustrating the hardware configuration of the ECU 22. As illustrated in FIG. 5, the ECU 22 is configured to include a central processing unit (CPU, or processor) 40, a read-only memory (ROM) 42, a random-access memory (RAM) 44, a storage 46, a GPS receiver 48, and a communication interface 50. These components are communicably connected to each other via a bus 51.

The CPU 40 executes various programs and controls the aforementioned components. That is, the CPU 40 reads the programs from the ROM 42 or the storage 46 and executes the programs using the RAM 44 as a work area. The CPU 40 controls the aforementioned components and performs various arithmetic processes in accordance with the programs recorded in the RUM 42 or the storage 46.

The ROM 42 stores various programs and various data. The RAM 44 temporarily stores programs or data as a work area. The storage 46 is configured by a hard disk drive (HDD) or a solid state drive (SSD) and stores various programs, including an operating system, and various data.

The GPS receiver 48 receives GPS signals from multiple satellites and identifies the position of the vehicle from differences in the arrival times of the signals.

The communication interface 50 is an interface for the ECU 22 to communicate with servers and other devices. The communication interface 50 uses a standard such as Ethernet (registered trademark), FDDI, and Wi-Fi (registered trademark), for example.

The restraining device control system 10 realizes various functions using the hardware resources illustrated in FIG. 4 and FIG. 5. The functional components realized by the restraining device control system 10 will be described with reference to FIG. 6.

Figure 6:
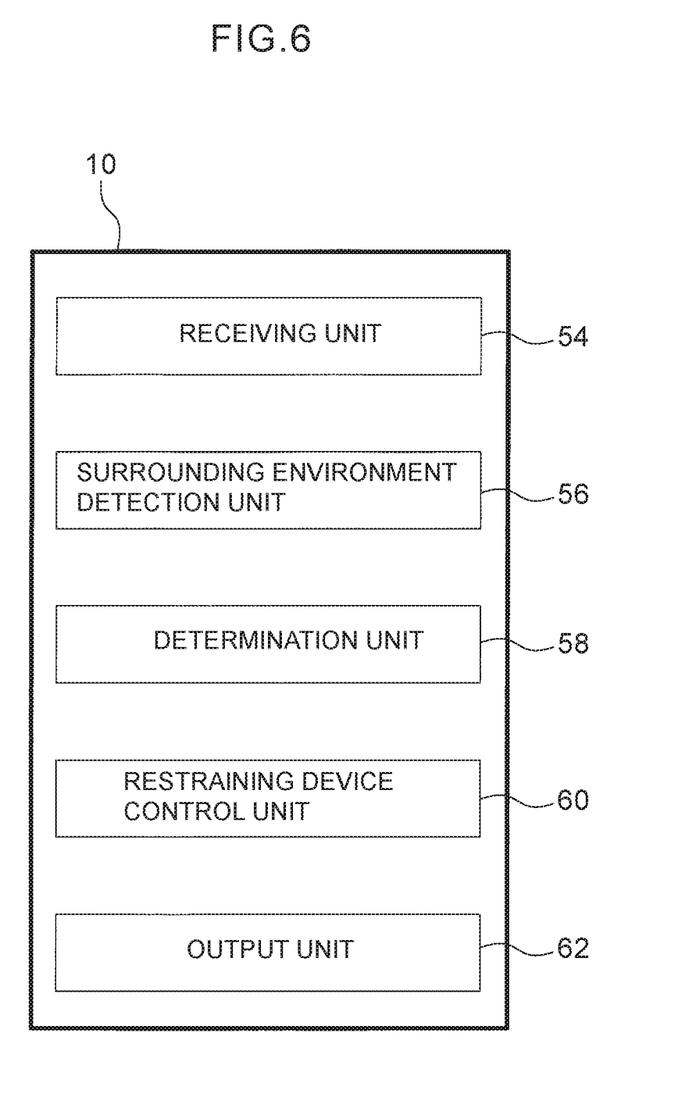
FIG. 6 is a block diagram illustrating functional components of the restraining device control system pertaining to the exemplary embodiment.

As illustrated in FIG. 6, the restraining device control system 10 has, as functional components, a receiving unit 54, a surrounding environment detection unit 56, a determination unit 58, a restraining device control unit 60, and an output unit 62. These functional components are realized as a result of the CPU 40 of the ECU 22 reading and executing the programs stored in the ROM 42 or the storage 46.

The receiving unit 54 receives signals such as map data sent from the servers and other external devices. The receiving unit 54 also receives data relating to the surrounding environment of the vehicle sent from the optical camera 32 and the surroundings detection sensor 34. Specifically, the receiving unit 54 receives information relating to obstacles surrounding the vehicle, information relating to bumps and dips in the road surface, and information relating to curves in the route the vehicle is going to travel.

The surrounding environment detection unit 56 detects the surrounding environment of the vehicle on the basis of data received from the receiving unit 54.

The determination unit 58 determines whether or not to perform control of the seat belt device 12 and the side support devices 30 (which are restraining devices) on the basis of information about the surrounding environment detected by the surrounding environment detection unit 56, The restraining device control unit 60 controls the seat belt device 12 and the side support devices 30.

The output unit 62 outputs information from the monitor 36 and the speaker 38 to the occupant P. Examples of the information, output by the output unit 62 include notifications that the seat belt device 12 will be activated, notifications that the side support devices 30 will be activated, and notifications relating to the surrounding environment of the vehicle.

Next, flows of restraining device control processes performed by the restraining device control system 10 will be described with reference to the flowcharts of FIG. 7 and FIG. 8. The restraining device control processes are performed as a result of the CPU 40 reading a program from the ROM 42 or the storage 46 and deploying and executing the program in the RAM 44.

Figure 7:
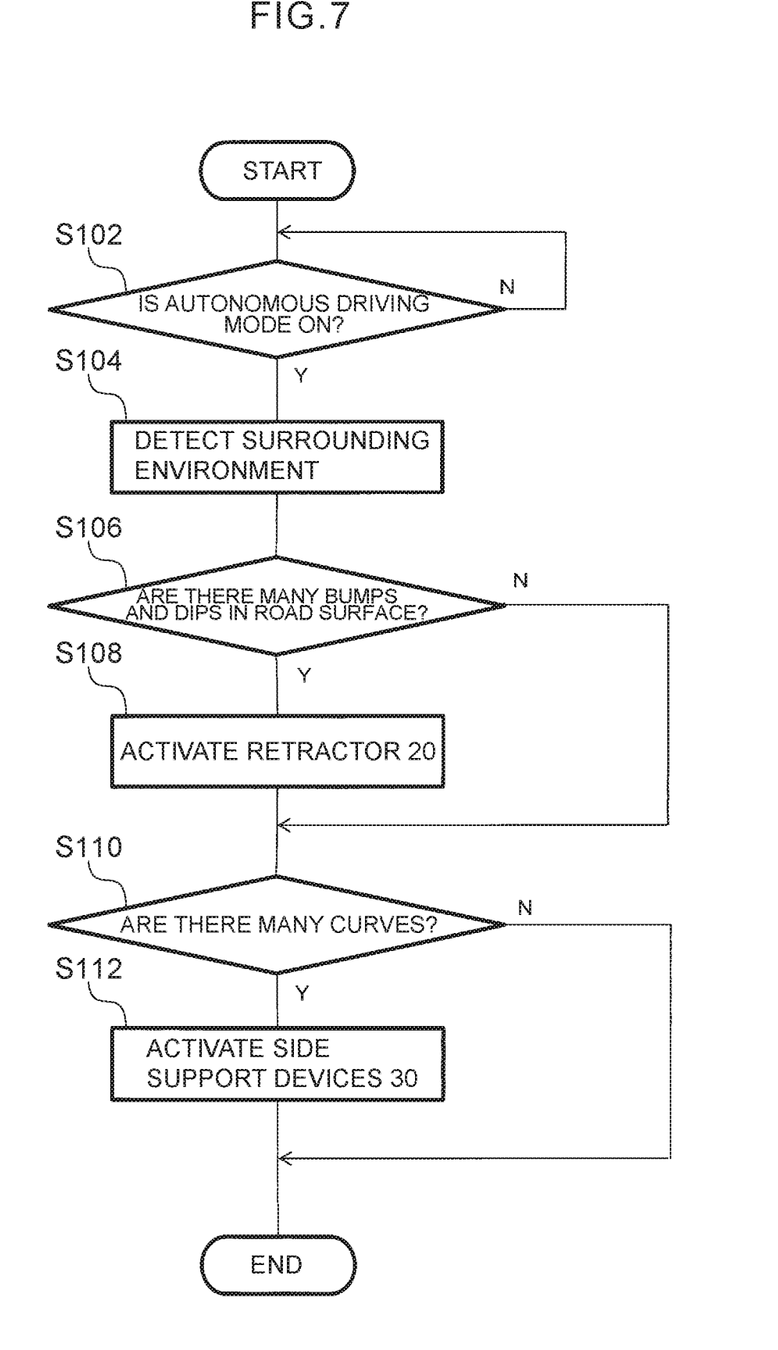
FIG. 7 is a flowchart illustrating an example of a flow of restraining device control processes.

FIG. 7 illustrates an example of a flow of processes when increasing the restraining force on the occupant P. As illustrated in FIG. 7, in step S102 the CPU 40 judges whether not the autonomous driving mode is on. For example, when the autonomous driving mode of the vehicle has been started by an operation by the occupant P, a signal indicating that the autonomous driving mode has been started is transmitted to the ECU 22, and the CPU 40 may use this signal to judge that the autonomous driving mode is on.

The CPU 40 moves to the process of step S104 in a case where it has been judged in step S102 that the autonomous driving mode is on. The CPU 40 repeats the process of step S102 in a case where it has not been judged in step S102 that the autonomous driving mode is on, that is, in a case where it has been judged that the autonomous driving mode is off.

In step S104 the CPU 40 detects the surrounding environment of the vehicle. Specifically, the CPU 40 uses the function of the surrounding environment detection unit 56 illustrated in FIG. 6 to detect the surrounding environment of the vehicle on the basis of signals from the optical camera 32 and the surroundings detection sensor 34 illustrated in FIG. 4. At this time, the CPU 40 may also receive map data by communicating with an external server and detect the surrounding environment of the vehicle.

In step S106 the CPU 40 judges whether or not there are many bumps and dips in the road surface on which the vehicle is going to travel. The CPU 40 may judge whether or not there are many bumps and dips in the road surface on the basis of signals from the optical camera 32 and the surroundings detection sensor 34. Furthermore, the CPU 40 may judge whether or not there are many bumps and dips in the road surface on the basis of the received map data. Moreover, the CPU 40 may judge whether or not there are many bumps and dips in the road surface on the basis of both of the above sets of information. Moreover, the CPU 40 may judge a road surface on which the vehicle is going to travel contains a threshold number of bumps, dips or any combination thereof.

The CPU 40 moves to the process of step S108 in a case where it has judged in step S106 that there are many bumps and dips in the road surface. The CPU 40 moves to the process of step S110, without performing the process of step S108, in a case where it has judged that there are few bumps and dips in the road surface.

In step S108 the CPU 40 activates the retractor 20 and then moves to the process of step S110. Here, the CPU 40 uses the function of the restraining device control unit 60 of FIG. 6 to activate the retractor motor 20A of the retractor 20 and increase the tension in the webbing 24 (see FIG. 2B). In this way, the CPU 40 increases the restraining force on the occupant P. It will be noted that before increasing the tension in the webbing 24, the CPU 40 may also use the monitor 36 and the speaker 38 to notify the occupant P that the restraining force will be increased.

In step S110 the CPU 40 judges whether or not there are many curves in the route the vehicle is going to travel. The CPU 40 may judge whether or not there are many curves on the basis of signals from the optical camera 32 and the surroundings detection sensor 34 or may judge whether or not there are many curves on the basis of the received map data. Furthermore, the CPU 40 may judge whether or not there are many curves on the basis of both of the above sets of information. Moreover, the CPU 40 may judge a road surface on which the vehicle is going to travel contains a threshold number of curves.

The CPU 40 moves to the process of step S112 in a case where it has judged in step S110 that there are many curves. Furthermore, the CPU 40 ends the processes, without performing the process of step S112, in a case where it has judged that there are few curves.

In step S112 the CPU 40 activates the side support devices 30. Here, the CPU 40 uses the function of the restraining device control unit 60 of FIG. 6 to activate the support motor 30A of the side support devices 30 and cause the side support portions 18A to project in the seat forward direction (see FIG. 3B). In this way the CPU 40 increases the restraining force on the occupant P. Then, the CPU 40 ends the processes. It will be noted that before moving the side support portions 18A, the CPU 40 may also use the monitor 36 and the speaker 38 to notify the occupant P that the restraining force will be increased.

As described above, in the present exemplary embodiment, the CPU 40 increases the restraining force on the occupant P by the seat belt device 12 and the side support devices 30 in a case where it has been predicted, from the surrounding environment of the vehicle detected by the surrounding environment detection unit 56, that the behavior of the vehicle will become larger than what it currently is.

Figure 8:
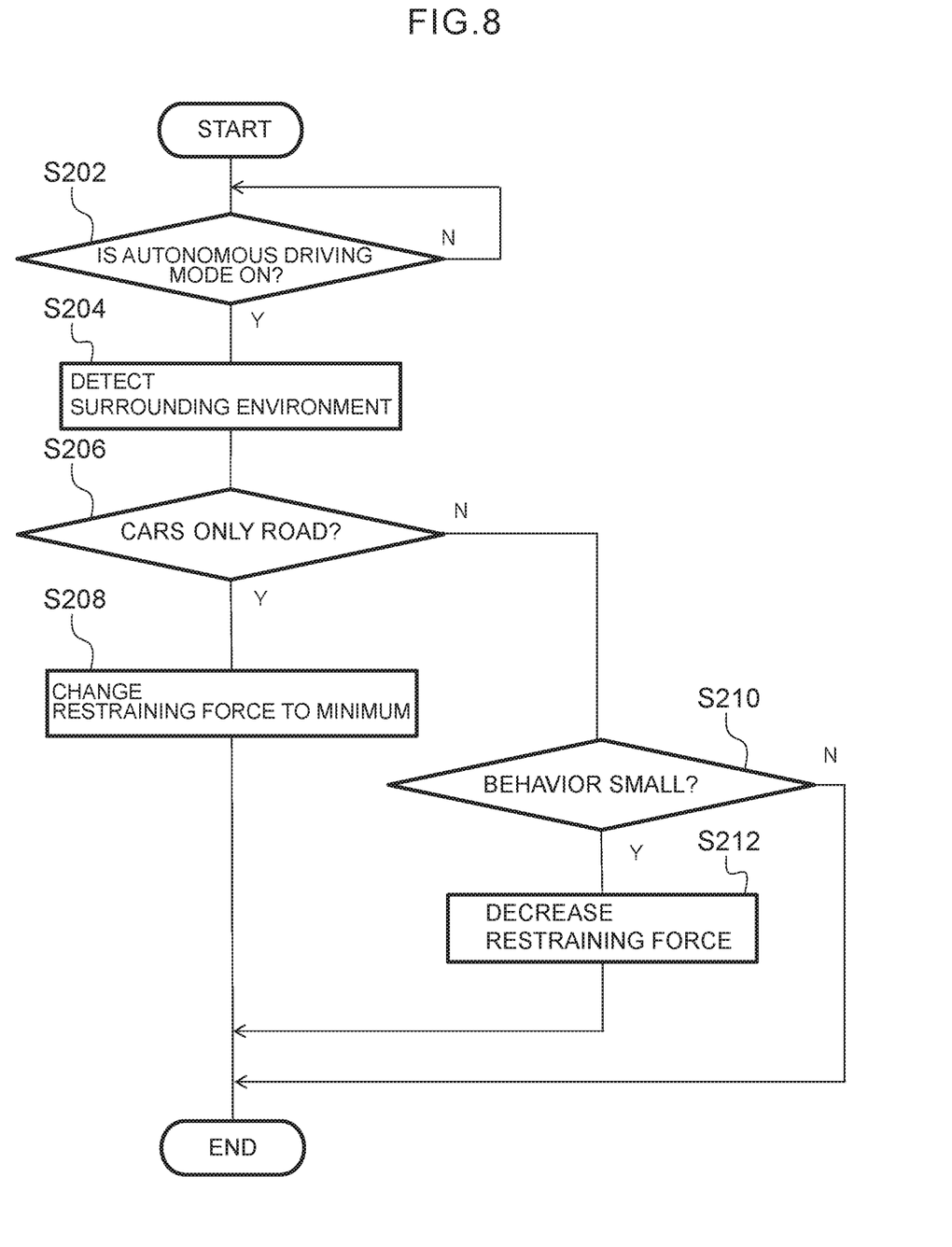
FIG. 8 is a flowchart illustrating another example of a flow of restraining device control processes.

Next, FIG. 8 illustrates an example of a flow of processes when decreasing the restraining force on the occupant P. As illustrated in FIG. 8, in step S202 the CPU 40 judges whether or not the autonomous driving mode is on.

The CPU 40 moves to the process of step S204 in a case where it has been judged in step S202 that the autonomous driving mode is on. The CPU 40 repeats the process of step S202 in a case where it has not been judged in step S202 that the autonomous driving mode is on, that is, in a case where it has been judged that the autonomous driving mode is off.

In step S204 the CPU 40 detects the surrounding environment of the vehicle. Specifically, the CPU 40 uses the function of the surrounding environment detection unit 56 illustrated in FIG. 6 to detect the surrounding environment of the vehicle on the basis of signals from the optical camera 32 and the surroundings detection sensor 34 illustrated in FIG. 4. At this time, the CPU 40 may also receive map data by communicating with an external server and detect the surrounding environment of the vehicle.

In step S206 the CPU 40 judges whether or not the vehicle is traveling on a cars-only road. The CPU 40 may perform the judgment on the basis of the signals from the optical camera 32 and the surroundings detection sensor 34 or may perform the judgement on the basis of the received map data. Furthermore, the CPU 40 may also perform the judgment on the basis of both of the above sets of information. It will be noted that what is here called a "cars-only road" is a road on which only cars are allowed to travel, such as a highway.

The CPU 40 moves to the process of step S208 in a case where it has judged in step S206 that the vehicle is traveling on a cars-only road. The CPU 40 moves to the process of step S210 in a case where it has judged in step S206 that the vehicle is not traveling on a cars-only road.

In step S208 the CPU 40 changes the restraining force on the occupant P to a minimum. Specifically, the CPU 40 activates the retractor motor 20A of the seat belt device 12 to let out a predetermined amount of the webbing 24 from the retractor 20. This decreases the tension in the webbing 24 to a prescribed minimum tension. At the same time, the CPU 40 activates the side support devices 30 so that the amount that the side support portions 18A project in the seat forward direction becomes a prescribed minimum amount of projection. Then, the CPU 40 ends the processes. It will be noted that before changing the restraining force, the CPU 40 may also use the monitor 36 and the speaker 38 to notify the occupant P that the restraining force will be decreased.

In step S210 the CPU 40 judges whether or not the behavior of the host vehicle is small. In other words, the CPU 40 judges whether or not the vacillation of the host vehicle is less than the threshold amount. Specifically, the CPU 40 judges, on the basis of information about the surrounding environment of the vehicle obtained by the function of the surrounding environment detection unit 56, whether the vehicle may maintain a state in which the behavior of the host vehicle is small. For example, judging from the map data, in a case where there are not any sharp curves for a while in the route the vehicle is going to travel or in a case where the vehicle is going to travel for a while on a road that has a flat road surface and few bumps and dips, the CPU 40 judges that the vehicle may maintain a state in which the behavior of the host vehicle is small.

The CPU 40 moves to the process of step S212 in a case where it has judged in step S210 that the vehicle may maintain a state in which the behavior of the host vehicle is small. The CPU 40 ends the processes, without performing the process of step S212, in a case where it has judged in step S210 that the vehicle may not maintain a state in which the behavior of the host vehicle is small. In this case, the process of decreasing the restraining force on the occupant P does not become performed.

In step S212, the CPU 40 decreases the restraining force on the occupant P. Specifically, the CPU 40 activates the retractor motor 20A of the seat belt device 12 to let out a predetermined amount of the webbing 24 from the retractor 20. At the same time, the CPU 40 activates the side support devices 30 to decrease by a predetermined amount the amount that the side support portions 18A project in the seat forward direction. That is, in the process of step S212, the CPU 40 decreases the restraining force on the occupant P but keeps the restraining force higher than what it is in the process of step S208. It will be noted that before changing the restraining force, the CPU 40 may also use the monitor 36 and the speaker 38 to notify the occupant P that the restraining force will be decreased.

As described above, in the present exemplary embodiment, the CPU 40 decreases the restraining force on the occupant P by the seat belt device 12 and the side support devices 30 in a case where it has been predicted that the vehicle will maintain a state in which the behavior of the vehicle while in the autonomous driving mode is small.

Operation

Next, the action of the present exemplary embodiment will be described.

The restraining device control system 10 of the present exemplary embodiment increases the restraining force on the occupant P by the seat belt device 12 and the side support devices 30 in a case in which it has been predicted, from the surrounding environment of the vehicle detected by the surrounding environment detection unit 56, that the vacillation of the vehicle while in the autonomous driving mode will exceed a threshold amount. Because of this, the occupant P may be well restrained even in a case where the behavior the vehicle will become large.

That is, in the autonomous driving mode, it is conceivable to decrease the restraining force on the occupant P to ensure comfort, but even in this case the restraining force on the occupant P may be increased before the behavior of the vehicle becomes large. As a result, the restraining force on the occupant P is increased only when necessary, and a balance between comfort and safety may be achieved.

Furthermore, the restraining device control system 10 decreases the restraining force on the occupant P by the seat belt device 12 and the side support devices 30 in a case where it has been predicted, from the surrounding environment of the vehicle detected by the surrounding environment detection unit 56, that the vehicle will maintain a state in which the behavior of the vehicle while in the autonomous driving mode is small. Because of this, the occupant P comfort performance in the autonomous driving mode may be enhanced.

In particular, the restraining device control system 10 of the present exemplary embodiment may inhibit the seating position of the occupant P from changing by increasing the restraining force on the occupant P by the seat belt device 12 even in a case where there are many bumps and dips in the road surface.

Furthermore, inertial movement of the occupant P in the seat width direction may be inhibited by activating the side support devices 30 to cause the side support portions 18A on both seat width direction sides of the seat back 18 to project in the seat forward direction even in a case where there are many curves in the route the vehicle is going to travel.

Here, the behavior of the vehicle is less likely to become large while the vehicle is traveling in the autonomous driving mode on a cars-only road that has few bumps and dips in the road surface and few sharp curves. In such cases, the restraining device control system 10 of the present exemplary embodiment may enhance comfort performance by decreasing the restraining force on the occupant P by the seat belt device 12 and the side support devices 30.

An exemplary embodiment has been described above, but naturally the disclosure may be implemented in various ways in a range that does not depart from the spirit of the disclosure. For example, in the above exemplary embodiment, the seat belt device 12 and the side support devices 30 were applied as restraining devices, but the restraining device control system may also have a structure in which other restraining devices are applied. For example, the restraining device control system may also be applied to a support device that causes both seat width direction sides of the seat cushion to bulge in the seat upward direction to restrain the occupant P.

Furthermore, in the above exemplary embodiment, a three-point seat belt device was illustrated in the drawings and described as the seat belt device 12, but the seat belt device is not limited to this. For example, a two-point seat belt device or a four-point seat belt device may also be used.

Moreover, in the above exemplary embodiment, a case where there are many bumps and dips in the road surface and a case where there are many curves were given as examples of cases where the behavior of the vehicle becomes large, but the restraining device control system is not limited to this. For example, the restraining device control system may also be similarly configured to predict that the behavior of the vehicle will become large and change the restraining force on the occupant P in a case where the grade of the road surface is equal to or greater than a predetermined grade, in a case where there are sharp curves, and in a case where the vehicle needs to change lanes.

Moreover, in the above exemplary embodiment, the restraining device control system was configured to change the restraining force on the occupant P to a minimum while the vehicle is traveling on a cars-only road, but the restraining device control system is not limited to this. For example, the restraining device control system may also be configured to vary the restraining force on the occupant P in accordance with the speed of the vehicle even while the vehicle is traveling on a cars-only road. Conversely, the restraining device control system may also be configured to change the restraining force on the occupant P to a minimum in a case where, even while the vehicle is traveling on a general road, there are few traffic signals, the presence of obstacles such as pedestrians in the vicinity is not recognized, and the probability that the behavior of the vehicle will become large is low.

Furthermore, the processes executed as a result of the CPU 40 reading software (programs) in the above exemplary embodiment may also be executed by various processors other than the CPU 40. Examples of processors in this case include a programmable logic device (PLD) whose circuit configuration may be changed after manufacture, such as a field-programmable gate array (FPGA), and a dedicated electrical circuit that is a processor having a circuit configuration designed exclusively for executing specific processes, such as an application-specific integrated circuit (ASIC). Furthermore, the above processes may be executed by one of these various processors or may be executed by a combination of two or more processors that are the same or different (e.g., plural FPGAs, and a combination of a CPU and a FPGA, etc.). Furthermore, the hardware structures of these various processors are more specifically electrical circuits in which circuit devices such as semiconductor devices are combined.

Moreover, in the above exemplary embodiment, the storage 46 was used as a recording unit, but the recording unit is not limited to this. For example, a recording medium such as a compact disk (CD), a digital versatile disk (DVD), and a universal serial bus (USB) memory may also be used as the recording unit.

What is claimed is:

1. A restraining device control system comprising:
   a restraining device that is provided at a vehicle seat and that restrains an occupant seated in the vehicle seat;
   a surrounding environment detection unit that detects an environment surrounding a vehicle; and
   a control unit that increases a restraining force on the occupant by the restraining device in a case in which it has been predicted, from the surrounding environment of the vehicle detected by the surrounding environment detection unit, that vacillation of the vehicle while in an autonomous driving mode will exceed a threshold amount and that decreases the restraining force on the occupant by the restraining device in a case in which it has been predicted, from the surrounding environment of the vehicle detected by the surrounding environment detection unit, that the vehicle will maintain a state in which vacillation of the vehicle while in the autonomous driving mode is less than the threshold amount, wherein before increasing or decreasing the restraining force on the occupant by the restraining device, the control unit uses a monitor and a speaker to notify the occupant that the restraining force will be changed.

2. The restraining device control system according to claim 1, wherein:

the restraining device includes a seat belt device that restrains the occupant in the vehicle seat, and the control unit increases the restraining force on the occupant by the seat belt device in a case in which it has been determined by the surrounding environment detection unit that a road surface on which the vehicle is going to travel contains a threshold number of bumps, dips or any combination thereof.

3. The restraining device control system according to claim 1, wherein:

the restraining device includes side support devices that are provided on both seat width direction sides of a seat back of the vehicle seat and which, upon activation, project in a seat forward direction to inhibit inertial movement of the occupant in a seat width direction, and the control unit activates the side support devices in a case in which it has been determined by the surrounding environment detection unit that a route that the vehicle is going to travel contains a threshold number of curves.

4. The restraining device control system according to claim 1, wherein the control unit decreases the restraining force on the occupant by the restraining device in a case in which it has been determined by the surrounding environment detection unit that the vehicle is traveling on a cars-only road.

* * * * *